May 19, 1931.  H. D. HUKILL  1,805,666

TUBE COUPLING

Filed July 19, 1928

INVENTOR
HENRY D. HUKILL
BY
ATTORNEY

Patented May 19, 1931

1,805,666

UNITED STATES PATENT OFFICE

HENRY D. HUKILL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

TUBE COUPLING

Application filed July 19, 1928. Serial No. 293,809.

This invention relates to pipe couplings, and more particularly to a pipe coupling of the compression sleeve type.

With prior types of compression sleeve couplings, it is necessary to entirely disassemble the pipe fitting, place the sleeve over the pipe, and then assemble the parts of the pipe fitting. Furthermore, in disassembling the fitting, the sleeve is often dropped and has to be picked up and placed on the pipe.

The principal object of my invention is to provide a self-centering sleeve, such that the pipe may be inserted in the pipe fitting without disassembling the fitting, so that a coupling may be more quickly and more easily effected.

Figure 1:
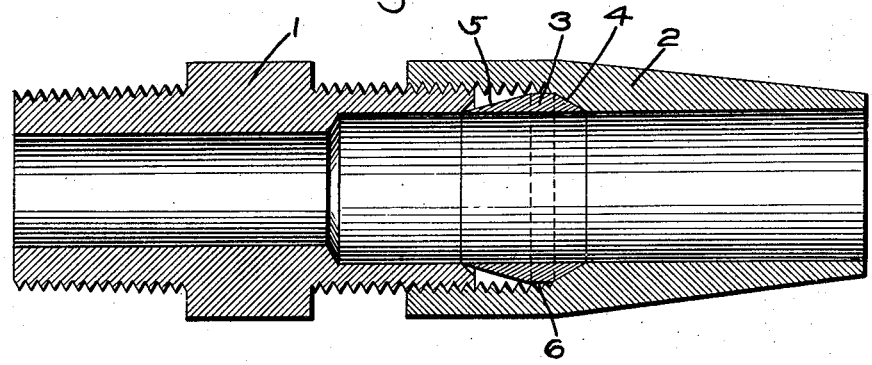
Figure 2:
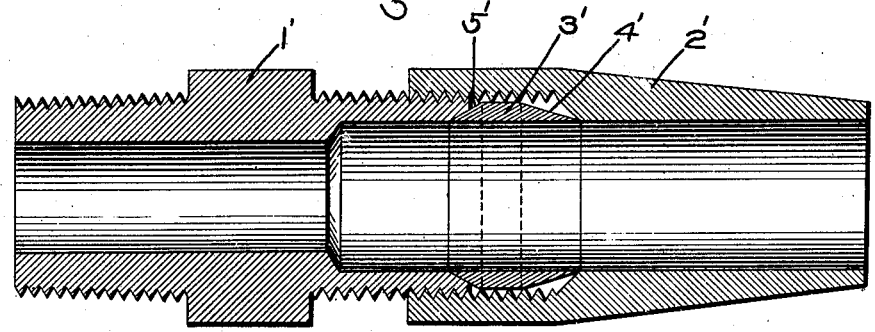

In the accompanying drawing, Fig. 1 is a sectional view of a pipe fitting, embodying my invention; and Fig. 2 a sectional view of a pipe fitting embodying my invention, in a somewhat modified form.

In Fig. 1 is shown a pipe fitting having a nipple 1 having at one end exterior screw threads and a nut 2 having interior screw threads adapted to engage the screw threads of the nipple.

A double tapered sleeve 3 is provided having the taper 4 at one end preferably at an angle of 60 degrees and the taper 5 at the other end at an angle of 15 degrees, the tapers running to a thin edge at the outer extremity.

The nut 2 is provided with a 60 degree taper adapted to engage the 60 degree taper of the sleeve and the nipple 1 is provided with a 45 degree taper.

Intermediate the tapers of the sleeve is a cylindrical portion 6 adapted to bear against the inner edges of the screw threads in the nut 2, so as to assist the taper 4 in centering the sleeve.

When the parts of the fitting are assembled, as shown in Fig. 1, the 45 degree taper of the nipple 1 permits only a point engagement with the 15 degree taper of the sleeve at the extreme thin edge of the taper. The 60 degree taper of the sleeve 3 fits the 60 degree taper of the nut 2 and thereby centers the sleeve with respect to the pipe fitting.

The sleeve being self-centered, a pipe may be readily inserted into the fitting without disassembling the fitting and with the assurance that the sleeve will not be cocked out of alinement with the pipe, so as to prevent insertion of the pipe.

After the pipe has been inserted into the fitting, the nut 2 is screwed down, so that the thin edge of the taper 5 is compressed into the pipe by the action of the taper on the nipple 1, while the 60 degree taper is also acted upon by the 60 degree taper in the nut 2, to compress the 60 degree end of the sleeve on the pipe.

The construction shown in Fig. 2 is similar to that shown in Fig. 1 except that in this case, the 60 degree taper of the sleeve is arranged to engage a 60 degree taper in the nipple 1', while the thin edge of the 15 degree taper of the sleeve is arranged to engage a 45 degree taper on the nut 2'.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a pair of coupling members, of a sleeve having opposed tapered surfaces tapered to a thin edge, one tapered surface engaging a surface of corresponding taper on one of the coupling members and the thin edge of the other tapered surface contacting with a more abrupt tapered surface on the other coupling member.

2. The combination with a pair of coupling members, of a sleeve having a sharp tapered surface at one end and an abrupt tapered surface at the other end, both surfaces being tapered to a thin edge, and the abrupt tapered surface engaging a corresponding tapered surface on one of the coupling members, while the thin edge of the sharp tapered surface contacts with a portion of an abrupt tapered surface on the other coupling member.

3. The combination with a pair of coupling members one having external screw threads engaging internal screw threads of the other member, of a sleeve having opposed tapered surfaces tapered to a thin edge and an intermediate cylindrical surface engaging the internal threads of one member, one tapered surface engaging a corresponding tapered surface of one member, and the other tapered surface having its thin edge engaging a portion of a more abrupt tapered surface on the other member.

In testimony whereof I have hereunto set my hand, this 14th day of July, 1928.

HENRY D. HUKILL.